(12) United States Patent
Schmidt

(10) Patent No.: US 12,662,139 B2
(45) Date of Patent: Jun. 23, 2026

(54) REDUNDANT SENSOR SYSTEM FOR COMMON MODE FAILURE AVOIDANCE

(71) Applicant: SAFRAN LANDING SYSTEMS CANADA INC, Ajax (CA)

(72) Inventor: Robert Kyle Schmidt, Brooklin (CA)

(73) Assignee: Safran Landing Systems Canada, Inc., Ajax (CA)

( * ) Notice: Subject to any disclaimer, the term of this patent is extended or adjusted under 35 U.S.C. 154(b) by 0 days.

(21) Appl. No.: 17/739,992

(22) Filed: May 9, 2022

(65) Prior Publication Data

US 2023/0356730 A1    Nov. 9, 2023

(51) Int. Cl.
*B60W 50/02*    (2012.01)
*B60W 40/12*    (2012.01)
*B60W 50/00*    (2006.01)

(52) U.S. Cl.
CPC ........ *B60W 50/0205* (2013.01); *B60W 40/12* (2013.01); *B60W 2050/0043* (2013.01); *B60W 2050/0215* (2013.01); *B60W 2510/0657* (2013.01)

(58) Field of Classification Search
CPC ................................................ B60W 50/0205
See application file for complete search history.

(56) References Cited

U.S. PATENT DOCUMENTS

| | | | |
|---|---|---|---|
| 4,760,745 A | 8/1988 | Garshellis | |
| 7,752,923 B2 * | 7/2010 | Shimizu | ......... G01L 3/103 |
| | | | 73/862.333 |

| | | | |
|---|---|---|---|
| 9,631,722 B2 * | 4/2017 | Pietron | ............ F16H 61/0213 |
| 9,683,906 B2 * | 6/2017 | Gießibl | ................ B65D 19/44 |
| 9,926,072 B2 * | 3/2018 | Collins | ................ B64C 25/22 |
| 11,486,776 B2 * | 11/2022 | Simard | ............... G01L 5/0023 |

(Continued)

FOREIGN PATENT DOCUMENTS

| | | | | |
|---|---|---|---|---|
| CA | 2877099 A1 * | 12/2013 | .......... | F16D 41/206 |
| CN | 211178809 U * | 8/2020 | | |

(Continued)

OTHER PUBLICATIONS

International Search Report and Written Opinion of the International Searching Authority mailed Jul. 10, 2023, issued in corresponding International Application No. PCT/CA2023/050589, filed May 1, 2023, 12 pages.

(Continued)

*Primary Examiner* — Shelley Chen
(74) *Attorney, Agent, or Firm* — Christensen O'Connor Johnson Kindness PLLC

(57) ABSTRACT

A redundant sensor system includes first and second sensors of the same type. The first and second sensors are configured to sense and measure a parameter, such as torque, applied to an object, such as a shaft. A preselected measurement value difference is provided between the first and second sensors. The preselected measurement value difference, such as an offset or a difference in sensor gain, can be utilized by the redundant sensor system or an associated control system to detect a failure of one of the sensors. Output signals of the first and second signals that do not reflect the preselected measurement value difference within given tolerance indicate that one of the sensors has failed, and a determination that an associated system is untrustworthy can be obtained.

11 Claims, 3 Drawing Sheets

(56) References Cited

U.S. PATENT DOCUMENTS

| | | | |
|---|---|---|---|
| 11,561,141 B2 * | 1/2023 | Gießibl | G01L 3/102 |
| 2005/0193834 A1 | 9/2005 | May | |
| 2008/0115591 A1 | 5/2008 | May | |
| 2008/0313886 A1 | 12/2008 | May | |
| 2009/0230953 A1 * | 9/2009 | Lee | G01L 3/102 |
| | | | 73/862.321 |
| 2012/0074933 A1 | 3/2012 | Lee | |
| 2014/0360285 A1 * | 12/2014 | Barraco | G01R 33/0029 |
| | | | 73/862.333 |
| 2016/0238472 A1 * | 8/2016 | Gießibl | G01R 33/1207 |
| 2019/0265324 A1 * | 8/2019 | Bilbao De Mendizabal | |
| | | | G01R 33/0023 |
| 2020/0017201 A1 | 1/2020 | Price et al. | |
| 2020/0172157 A1 | 6/2020 | Patel et al. | |
| 2021/0017880 A1 * | 1/2021 | Trappier | F01D 21/02 |
| 2022/0291017 A1 * | 9/2022 | Kappert | G01D 11/245 |
| 2023/0266185 A1 | 8/2023 | Breitfeld et al. | |

FOREIGN PATENT DOCUMENTS

| | | | | |
|---|---|---|---|---|
| CN | 108995528 B | * | 7/2021 | B60K 17/22 |
| DE | 10 2015 102 337 A1 | | 8/2016 | |
| DE | 10 2020 213 669 A1 | | 5/2022 | |
| EP | 1706709 B1 | | 9/2009 | |
| JP | 2005220950 A | * | 8/2005 | |
| JP | 2021143987 A | | 9/2021 | |
| WO | 2021/094319 A1 | | 5/2021 | |
| WO | WO-2021104967 A1 | * | 6/2021 | G01L 1/16 |

OTHER PUBLICATIONS

Extended European Search Report mailed on Apr. 10, 2026 in European Application No. 23802378.2; 12 pages.

* cited by examiner

2/3

REDUNDANT SENSOR SYSTEM FOR COMMON MODE FAILURE AVOIDANCE

BACKGROUND

Engineering systems ranging from power plants to aircraft rely on mechanical, electrical, and/or computer systems for such tasks as generating power, producing thrust, generating lift or braking force, dissipating energy (e.g., heat), etc. These systems are typically monitored via control systems that employ sensors for reading critical operational parameters, such as pressure, temperature, position, voltage, speed, torque, etc.

In some prior art systems, a single sensor is employed for each system parameter. When a system parameter is monitored by a single sensor, the associated control system lacks critical information to determine whether or not the output of the sensor is accurate and/or reliable.

Redundancy (e.g., the use of two or more sensors) is a common approach to address problems associated with single sensor monitoring in order to improve the reliability and availability of the control system. While adding redundant sensors increases the cost and complexity of a control system, such redundant sensor arrangements are highly desirable if the cost of failure is high, such as in safety critical applications. And in some safety critical systems, such as those found on aircraft, redundancy is more than likely mandatory.

In a redundant sensor arrangement (e.g., using two or more sensors to monitor the same parameter), it is possible to determine whether or not one of the sensors has failed (e.g., via comparisons, voting, etc.). If a sensor has failed, the control system typically reverts to an alternative control mode, or indicates to a technician, driver, pilot, etc., that the particular monitored system is untrustworthy.

Adding redundant sensors does not address every problem associated with the reliability and availability of a control system. For example, the occurrence of common mode breakdowns, also known as common mode failures, can drastically affect the reliability and availability of the control system. A common mode failure is a single event that can cause or lead to the failure of multiple redundant elements in a system. Common mode failures are often unpredictable and unpreventable, like a lightning strike, electromagnetic interference, a fire, an undetected manufacturing defect, or an explosion. In instances of a common mode failure, it is often impossible for a control system to determine if one of the sensors in a redundant sensor system has failed.

SUMMARY

Embodiments of the present disclosure relate to a redundant sensor system. In an embodiment, a redundant sensor system is provided for sensing and measuring a parameter associated with an object. The redundant sensor system comprises a first sensor configured to sense and measure said parameter associated with the object, wherein the first sensor is configured to output a signal indicative of the parameter to be measured. The redundant sensor system also includes a second sensor configured to sense and measure said parameter of the object. In some embodiments, the first and second sensors are of the same type, and wherein the first and second sensors are configured such that the signal output of the first and second sensors have a preselected measurement value difference for each measurement of the parameter.

In any embodiment of the present disclosure, the redundant sensor system may further comprise control circuitry connected in communication with the first sensor and the second sensor. In some of these embodiments, the control circuitry is configured to determine failure of one of the first and second sensors based on signal output of the first and second sensors.

In any embodiment of the present disclosure, the control circuitry is configured to: receive the signal output of the first sensor and the signal output of the second sensor; and calculate the difference in value between the signal output of the first sensor and the signal output of the second sensors.

In any embodiment of the present disclosure, the control circuitry is further configured to compare the difference in value calculated to the preselected measurement value difference, and to output a signal that indicates one of the first and second sensors has a failed state based on said comparison.

In any embodiment of the present disclosure, the preselected measurement value difference is an offset value in the measurement by the first sensor as compared to the measurement by the second sensor.

In any embodiment of the present disclosure, the preselected measurement value difference is a sensor gain difference between the first sensor and the second sensor.

In any embodiment of the present disclosure, the parameter to be measured is torque and the object is a shaft.

In any embodiment of the present disclosure, the first and second sensors each include a first part that is formed by or affixed to the shaft.

In any embodiment of the present disclosure, the first and second sensors are magnetoelastic sensors; the first part of the first and second sensors includes a magneto-elastically active region; and the first and second sensors each include a magnetometer associated with a respective magneto-elastically active region.

In any embodiment of the present disclosure, the preselected measurement value difference is an offset value in the measurement by the first sensor as compared to the measurement by the second sensor, wherein the magneto-elastically active region of first and second sensors each have a magnetization, and wherein the offset value is generated by a difference in magnetization between the magneto-elastically active regions of the first and second sensors.

In any embodiment of the present disclosure, the preselected measurement value difference is a sensor gain difference between the first sensor and the second sensor, wherein the magneto-elastically active region of the first and second sensors each have the same magnetization, and wherein the sensor gain difference is generated by the configuration of the shaft.

In any embodiment of the present disclosure, the sensor gain difference is generated by the configuration of the shaft and includes a first section of the shaft having a first cross-sectional area and a second section of the shaft having a larger, second cross-sectional area, wherein the first sensor is positioned to measure the torsional stress induced in the first section by the applied torque and the second sensor is positioned to measure the torsional stress induced in the second section by the applied torque.

In any embodiment of the present disclosure, the magneto-elastically active region of each sensor includes two axially distinct oppositely polarized magnetically conditioned sub-regions.

In any embodiment of the present disclosure, the magnetically conditioned sub-regions are selected from the group consisting of bands, strips, rings, and collars, the magnetically conditioned sub-regions being affixed to the shaft.

In accordance with another aspect, a redundant sensor system is provided. In an embodiment, the redundant sensor system includes a first magnetoelastic sensor configured to sense and measure a torque applied to a shaft, wherein the first magnetoelastic sensor is configured to output a signal indicative of the torque to be measured. The redundant sensor system also includes a second magnetoelastic sensor in close proximity to the first magnetoelastic sensor, the second magnetoelastic sensor configured to sense and measure said torque applied the shaft, wherein second magnetoelastic sensor is configured to output a signal indicative of the torque to be measured.

In some embodiments, the first and second magnetoelastic sensors are configured to output signals having a preselected measurement value difference when torque is applied to the shaft, the preselected measurement value difference being one of an offset value or a difference in sensor gain.

In some embodiments, the redundant sensor system includes control circuitry connected in communication with the first magnetoelastic sensor and the second magnetoelastic sensor, the control circuitry configured to: receive the signal output of the first magnetoelastic sensor and the signal output of the second magnetoelastic sensor; and determine that one of the sensors has failed if the preselected measurement value difference is not present within a given tolerance level.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The following discussion provides examples of a redundant sensor system for use with various systems of a vehicle, for example, an aircraft. In some embodiments, these redundant sensor systems can be employed in safety critical systems of the aircraft, such as aircraft landing gear, turbine engines, propeller/rotor engines, etc. In a certain embodiment, the redundant sensor system can be employed in the landing gear disclosed in US Patent Publication 2020/

0017201, which is presently assigned to Safran Landing Systems. As will be described in more detail below, the redundant sensor systems of the present disclosure are configured to avoid issues relating to common mode failures. While embodiments of the redundant sensor system may be described as being used in conjunction with aircraft in general or aircraft landing gears in particular, the sensor systems of the present disclosure may be advantageously utilized with other vehicles, or in other mechanical systems where redundancy is desirable.

Figure 1:
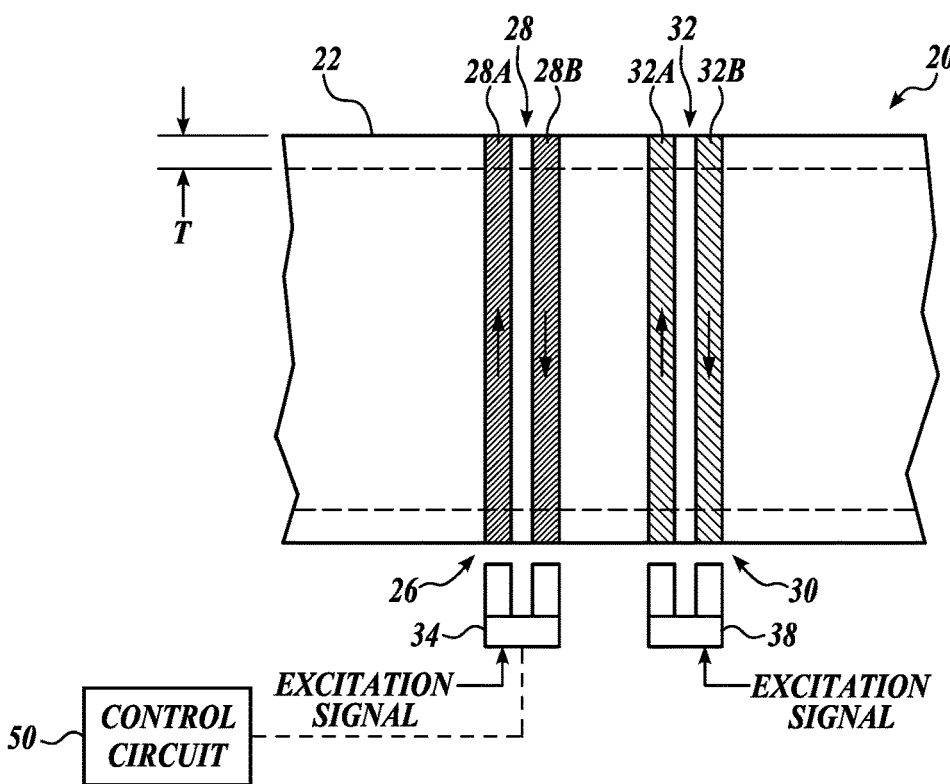
FIG. 1 is a schematic representation of a sensor system formed in accordance with an embodiment of the present disclosure.

FIG. 1 illustrates an embodiment of a redundant sensor system, generally designated 20, formed in accordance with aspects of the present disclosure. The redundant sensor system 20 is configured to sense and measure a parameter of interest, such as a torque, applied to an object, such as a cylindrical shaft 22. Of course, aspects of the redundant sensor system 20 may be used for sensing and measuring other parameters of interest, and thus, any reference to torque is merely done for illustration purposes only, and should not be considered limiting to the claimed subject matter.

As shown in FIG. 1, the redundant sensor system 20 includes a first sensor 26 and a second sensor 30. Each sensor 26, 30 is configured to sense and measure the same parameter of interest, such as torque applied to the shaft 22, and thus, can be referred to as redundant sensors. In some embodiments, the first sensor 26 is disposed in close proximity to a second sensor 30. The term "in close proximity" means a positional relationship between the first and second sensors such that the sensors can sense and measure the same parameter of interest within a preselected tolerance level, such as between about ±0.1% and 1.0%.

In accordance with an aspect of the present application, each sensor 26, 30 of the redundant sensor system 20 employs the same technology to sense and measure the parameter of interest. For example, the redundant sensors 26, 30 can both be hall effect sensors, eddy current sensors, strain gauges, etc., configured and arranged to sense and measure torque. Other sensor technologies that are capable of sensing and measuring torque can be practiced with embodiments of the present application. One such sensor type, known generally as a magnetoelastic sensor, will be explained in greater detail below according to embodiments of the present disclosure.

In the embodiment shown, each sensor 26, 30 is configured to sense torque applied to the shaft 22 in a non-contact manner. The shaft 22, a section of which is depicted in a side view in FIG. 1, may be rotatable about its central longitudinal axis, or may be stationary. In some applications, such as a drive shaft, a torque applied at one portion of the shaft 22 is transmitted thereby to another portion of the shaft 22 such that the application of the torque results in the performance of some useful work. The motion of the shaft 22, or the applied torque, may be in either a clockwise or counterclockwise direction when looking upon an end of the shaft 22.

In some embodiments, the shaft 22 can be hollow or includes hollow sections, as shown in FIG. 1. In other embodiments, the shaft 22 may be solid with a constant diameter. In embodiments that employ a hollow shaft or hollow sections, the hollow shaft (or sections) may have a constant wall thickness T, as shown in FIG. 1. The shaft 22 may be formed of a homogeneous material or may be formed of a mixture of materials.

One representative embodiment of the sensors 26, 30 that can be employed by the system 20 will now be described in detail. The shaft 22 includes a first part of each sensor 26, 30 in the form of magneto-elastically active region 28, 32, respectively, as shown in the embodiment of FIG. 1. The magneto-elastically active regions 28, 32 may be an integral and homogeneous part of the shaft 22, or may be formed by strips, bands, rings or collars fixedly attached to the shaft 22. The magneto-elastically active regions 28, 32 may be formed by any suitable technique known in the art or developed in the future. It will be appreciated that the materials selected for forming the magneto-elastically active regions 28, 32 are at least ferromagnetic to ensure the existence of magnetic domains for at least forming magnetization in the magneto-elastically active regions 28, 32, and are magnetorestrictive such that the orientation of magnetic field lines in the magneto-elastically active regions 28, 32 may be altered by the stresses associated with the parameter of interest, such as for example, applied torque.

In the embodiment of FIG. 1, at least two axially distinct oppositely polarized magnetically conditioned bands or sub-regions 28A, 28B define the magneto-elastically active region 28 of the sensor system 20. Similarly, at least two axially distinct oppositely polarized magnetically conditioned bands or sub-regions 32A, 32B define the magneto-elastically active region 32 of the sensor system 20. Thus, the sensors 26, 30 may be referred to as magnetoelastic sensors of the dual-band type. The magnetically conditioned sub-regions 28A, 28B, and 32A, 32B, are magnetically polarized in opposite circumferential directions by any suitable method known in the art. Arrows depicted in FIG. 1 show representative directions of polarization of the magnetically conditioned sub-regions 28A, 28B, and 32A, 32B when the shaft 22 is in the quiescent state.

When a torque is applied to the shaft 22, the shaft 22, and thus the magneto-elastically active regions 28, 32, are subjected to torsional stress, which causes reorientation of the polarized magnetization in the magnetically conditioned sub-regions 28A, 28B, and 32A, 32B. In other words, when a torque is applied to the shaft 22, the magnetically conditioned sub-regions 28A, 28B, and 32A, 32B may exhibit torque-induced magnetization components in the radial or axial directions or both. Reorientation of the polarized magnetization in the magnetically conditioned sub-regions 28A, 28B, and 32A, 32B causes a magnetic flux to develop in proximity of the shaft (e.g., around the circumference of the shaft). Due to the configuration and arrangement of the magneto-elastically active regions 28, 32, the magnitude of the magnetic flux is linearly proportional to the stress, and therefore, the torque applied to the shaft 22, and the polarity of the magnetic field indicates the direction of the torque.

Still referring to FIG. 1, each sensor 26, 30 includes a second part in the form of magnet field transducers, such as magnetometers 34, 38, respectively, for determining the magnitude and direction of the applied torque based on a sensed magnetic flux. The magnetometers 34, 38 are axially aligned and positioned proximate the magneto-elastically active regions 28, 32, respectively, in a non-contact manner. In the embodiment shown, the magnetometers 34, 38 are each shown as fluxgate magnetometer pairs that correspond to the magnetically conditioned subregions 28A, 28, and 32A, 32B, respectively. The magnetometers 34, 38 are oriented so as to sense the magnitude and polarity of the axial and/or radial field components induced in the magnetically conditioned sub-regions as a result of the reorientation of the polarized magnetization when torque is applied to shaft 22. The magnetometers 34, 38 are configured (e.g., include sensor circuitry, etc.) to convert the sensed magnetic changes of the magnetized regions into suitable output signals, which are indicative of the magnitude and direction (optional) of the torque applied to the shaft 22.

Each magnetometers 34, 38 is connected to a source of direct or alternating current or an excitation signal. Each magnetometer 34, 38 is also connected to a signal processing device, such as a monitoring or control circuit 50, so that the output signals can be transmitted thereto for processing. In some embodiments, the magnetometers 34, 38 are configured such that the representative signals outputted by the magnetometers 34, 38 vary linearly with respect to variations in the torque applied to the shaft 22.

As was briefly mentioned above, redundancy of sensors provide critical safety to vehicle systems, such as aircraft. However, even redundant sensors using the same technology cannot overcome problems arising from common mode failure. Therefore, in accordance with an aspect of the present application, the redundant sensor system 20 is configured to address or avoid problems associated with a common mode failure. Some systems in the prior art address or avoid problems associated with a common mode failure by using two sensors of disparate technology. For example, one such system in the prior art could include both a strain gauge and a hall effect sensor to measure the torque applied to the shaft.

Figure 2:
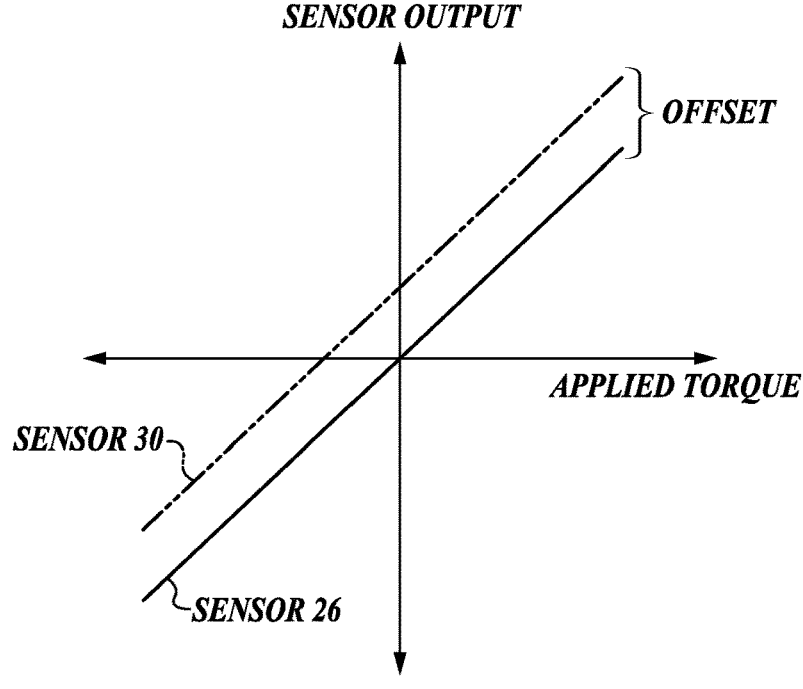
FIG. 2 is a graphical representation of the signal output values of the sensor system of FIG. 1.

In contrast to the systems of the prior art, embodiments of the redundant sensor system 20 utilize sensors of the same type (i.e., same technology), but configured so that a preselected value difference is present between the sensors 26 and 30 for each torque measurement. In certain embodiments described herein and shown in FIGS. 1 and 2, both sensors of the redundant sensor system 20 are of the magnetoelastic type, and the preselected value difference can be an offset measurement value. For example, FIG. 2 is a graphical representation of the signal output of the sensor system of FIG. 1 when a torque is applied to shaft 22. As shown in FIG. 2, the preselected value difference or offset is shown by the preset, fixed, difference in output values of sensors 26, 30 at zero applied torque. Additionally, FIG. 2 shows that both sensors 26, 30 are configured to have the same relationship between signal output vs. applied torque (e.g., both sensors have the same output vs. torque slope).

The measured value difference, or offset, can be configured into the sensors 26, 30 in a number of ways. For example, in one embodiment, the magnetically conditioned sub-regions 32A, 32B of the magneto-elastically active region 32 are configured to have a magnetization that is greater than the magnetization of the magnetically conditioned sub-regions 28A, 28B of the magneto-elastically active region 28 by a preselected and fixed, offset value. In other words, the magnetization of the magnetically conditioned sub-regions 28A, 28B and 32A, 32B are such that the torque-induced magnetic fields emanating from the magnetically conditioned regions 28 and 32 are different in magnitude by the preselected and fixed, offset value. The different magnetization of the magneto-elastically active regions 28, 32 is depicted in FIG. 1 with different cross hatching.

In other embodiments, the offset can be accomplished by other techniques. For example, in some embodiments, the ferromagnet material employed by the magneto-elastically active region 28 may be different than the ferromagnet material employed by the magneto-elastically active region 32. In some embodiments, the dimensions (e.g., thickness) of the strips, bands, rings, etc., of the magneto-elastically active region 32 may be greater that the dimensions (e.g., thickness) of the strips, bands, rings, etc., of the magneto-elastically active region 28. Alternatively or additionally, the offset can be carried out by the magnetometers 34, 38.

As will be described in more detail below, the preselected measurement value difference, such as the offset, can be utilized by the redundant sensor system 20 or an associated control system to detect a failure of one of the sensors 28, 32. For example, a detected offset outside of a given tolerance indicates that one of the sensors has failed. While such an arrangement may not be able to determine which sensor failed, a determination that the system is untrustworthy can nevertheless be obtained from such a detected offset. On the other hand, a detected offset within a given tolerance indicates that both sensors are functioning within acceptable operational parameters.

Figure 3:
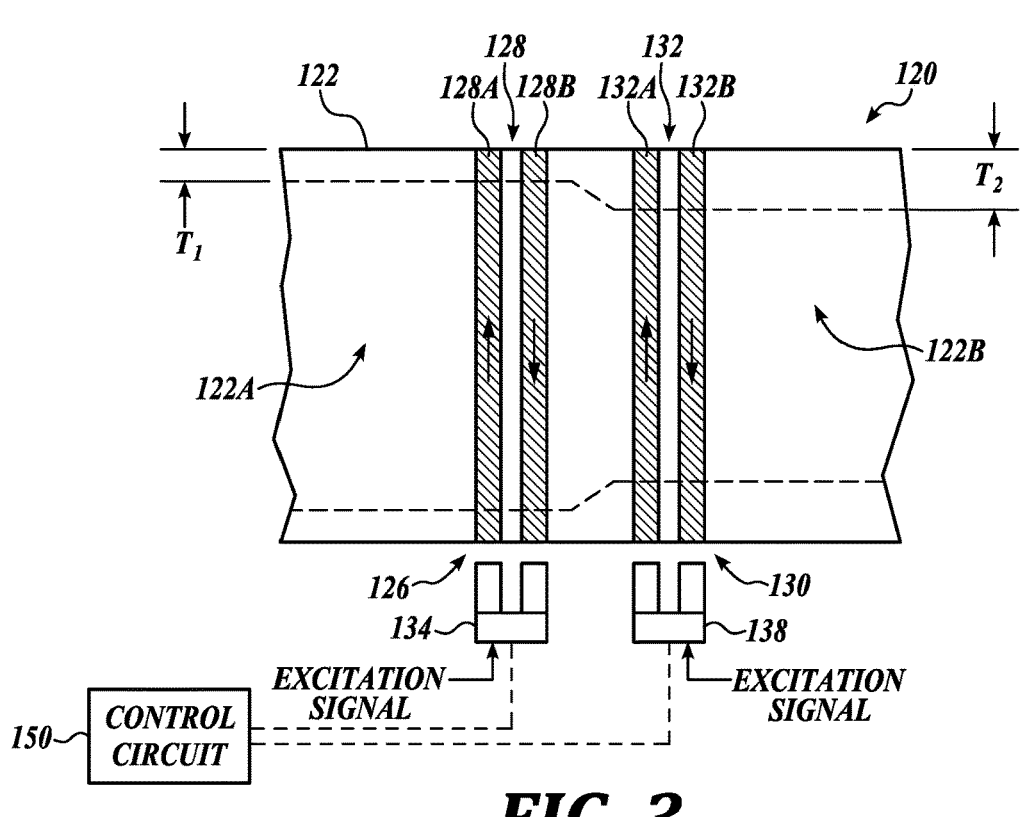
FIG. 3 is a schematic representation of a sensor system formed in accordance with another embodiment of the present disclosure.

FIG. 3 illustrates another embodiment of the redundant sensor system, generally designated 120, formed in accordance with aspects of the present disclosure. The redundant sensor system is substantially similar in construction and operation as the redundant sensor system 20 described above with regard to FIG. 1, except for the differences that will be described in more detail below. Components of the redundant sensor system 120 shown in FIG. 3 that are labeled with reference number 1XX correspond to similar components labeled with reference number XX in FIG. 1, except as noted. For example, the magnetometers 134, 138 shown in FIG. 3 are similar to the magnetometers 34, 38 shown in FIG. 1 unless otherwise described.

Figure 4:
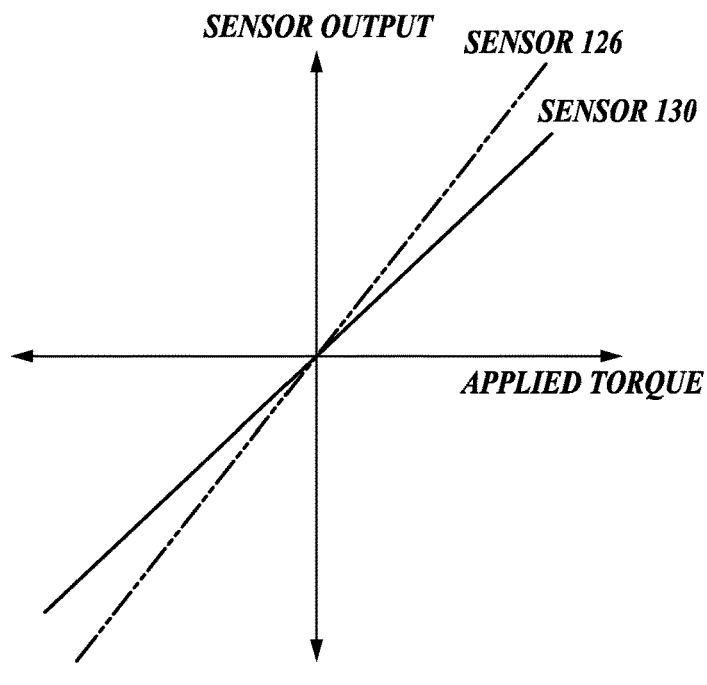
FIG. 4 is a graphical representation of the signal output values of the sensor system of FIG. 3.

Embodiments of the redundant sensor system 120 utilize sensors of the same type (i.e., same technology), but configured so that a preselected value difference is present between the sensors 126 and 130 for each torque measurement. In a certain embodiment shown in FIG. 3, both sensors of the redundant sensor system 120 are of the magnetoelastic type, and the preselected value difference can be in gain. For example, FIG. 4 is a graphical representation of the signal output of the sensor system of FIG. 3 when a varying amount of torque is applied to shaft 22. As shown in FIG. 4, the output values of sensors 126, 130 are the same at zero applied torque. However, the preselected value difference or gain is shown by the difference in the relationship between signal output vs. applied torque (e.g., the sensors have different output vs. torque slopes).

In the embodiment shown in FIG. 3, the preselected value difference as gain can be carried out using identical magneto-elastically active regions 128, 132, for sensors 126, 130, respectively, but altering the configuration of the shaft 122. For example, FIG. 3 shows an embodiment employing a hollow shaft or hollow sections. In this embodiment, the hollow shaft 122 includes first and second hollow shaft sections 122A, 122B with different inner diameters (i.e., different wall thicknesses $T_1$, $T_2$, respectively). As such, the first sensor 126 measures torsional stress induced in the first hollow section 122A and the first sensor 130 measures torsional stress induced in the second hollow section 122A. Alternatively, the shaft 122 could be configured with different outer diameters for the first and second hollow shaft sections 122A, 122B. Of course, a solid shaft with different diameter sections could also be used.

By changing the thickness of the sections 122A, 122B of the shaft 122 subject to measurement, a repeatable and accurate relationship is formed between the measurement values of the first sensor 126 and the second sensor 130 when the shaft 122 is subject to an applied torque. For example, when zero torque is applied to shaft 122 (e.g., when the shaft 122 is in the quiescent state), both sensors 126, 130 will output a signal value of zero. This can be seen graphically in FIG. 4. On the other hand, when the shaft 122 is subjected to torsional stress by an applied torque with a magnitude greater than zero, a linear variation in readings between sensor 126 and sensor 130 occurs, which is proportional to the difference in cross-sectional size of the shaft 122.

Accordingly, since there is a fixed ratio between the output of the first and second sensors 126, 130, a comparison can be made for any applied torque to determine if one of the sensors has failed. For example, if the cross-sectional area for sensor 130 is 20% greater than the cross-sectional area for sensor 126, a 20% difference in measurement value (i.e., the output signal value) should always be present if neither of the sensors has failed. Any variation beyond this ratio (±any acceptable tolerance) will indicate an error in the measurement of one of the sensors 126, 130.

Of course, other embodiments of the redundant sensor system 120 may employ other techniques or methodologies to achieve such a difference in gain between sensors. For example, in some embodiments the difference in gain can be achieved by altering the magnetization of magnetically conditioned sub-regions 128A, 128B and 132A, 132B.

Some embodiments of the presently disclosed sensor system include a monitoring circuit, a controller, or a control circuit, such as control circuits 50, 150, etc., configured (e.g., programmed, etc.,) to receive output signals from first and second sensors (e.g., from magnetometers 34, 38, 134, 138, etc., and to determine whether one of the sensors has failed. In the embodiment of FIG. 1, the control circuit 50 is configured (e.g., programmed, etc.,) to compute the difference in value of the output signals received from the magnetometers 34, 38, and to compare the computed difference to the offset value.

In the embodiment of FIG. 3, the control circuit 150 is configured (e.g., programmed, etc.,) to calculate, for example, the ratio of the gain from the output signals received from the magnetometers 34, 38, and to compare any difference in the calculated ratio to the preselected gain ratio.

In other embodiments, the control circuit 150 is configured (e.g., programmed, etc.,) to calculate the expected measurement value of the second sensor 128 from the measurement value obtained from the first sensor 132, or vice versa. In the example described above regarding the different cross-sectional areas of the shaft 122, the expected value difference for the second sensor 128 is calculated by the equation (1):

$$2^{nd}\ Sensor_{EV}{=}1st\ Sensor_{MV}X(\text{Difference in Cross Section of Shaft,e.g.,0.8}) \qquad (1);$$

wherein MV is Measured Value and EV is Expected Value.

In some embodiments, the control circuits 50, 150, etc., are configured to output an error notification if the computed difference varies from either the offset value or the preselected gain ratio by a preselected confidence level. In some embodiments, the confidence level can range from between about 0.1% of the preselected valve difference to about 5% of the preselected valve difference.

In some embodiments, the control circuit 50, 150, etc., is a discrete control circuit. In other embodiments, the described functions of the control circuit are performed by one or more other control circuits, control units, controllers, etc., of an associated system, such as the FADEC of an aircraft. In some embodiments, the control circuits, control units, etc., comprise hardware circuitry (e.g., analog and/or digital circuits, etc.) for carrying out its functionality described herein. In other embodiments, the control circuit or the various control units include, for example, a processor and memory.

The memory may include computer readable storage media in read-only memory (ROM), random-access memory (RAM), and keep-alive memory (KAM), for example. The KAM may be used to store various operating variables or program instructions while the processor is powered down. The program instructions, when executed by the processor, is configured to carry out the functionality of the control circuit described herein. In that regard, the processor and/or memory storing the program instructions forms a special purpose controller or control circuit specifically configured to carry out the methodologies and technologies described herein.

The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, instructions, programs, modules, etc.

As used herein, the term "processor" is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "processor" can be used to generally describe these aforementioned components, and can be either hardware or software, or combinations thereof, that implement logic for carrying out various aspects of the present disclosure. Similarly, the terms "module" and "unit" can include logic that may be implemented in either hardware or software, or combinations thereof.

Figure 5:
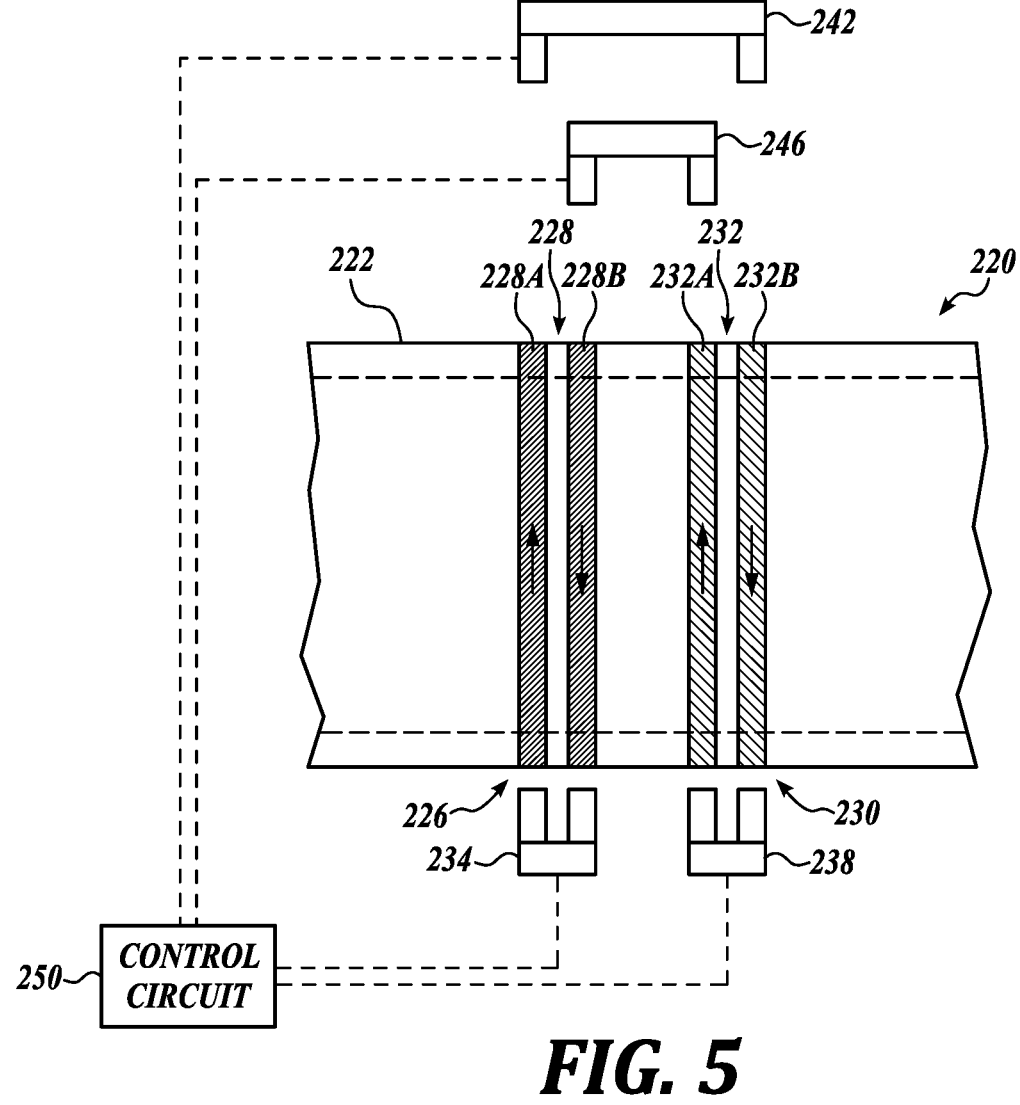
FIG. 5 is a schematic representation of a sensor system formed in accordance with another embodiment of the present disclosure.

It will be appreciated that other variations of the redundant sensor system are possible. For example, while redundant sensor systems 20, 120, etc., are shown with two sensors, it will be appreciated that the redundant sensor systems of the present disclosure may include more than two sensors (e.g., three, four, etc., sensors). In these embodiments, the additional sensor(s) may be used to determine which of the sensors had failed. Such determination can be accomplished by any suitable technique such as output value comparison, voting, etc. Of course, other configurations may be employed to determine sensor failures. For example, as shown in the embodiment of FIG. 5, additional magnetometers 242, 246 (shown as fluxgate magnetometer pairs, may be employed to read the magnetic flux of the magnetically conditioned sub-regions 228A, 228B and 232A, 232B. As shown, the magnetometer 242 is associated with magnetically conditioned sub-regions 228A, 232B, while the magnetometer 246 is associated with magnetically conditioned sub-regions 228B, 232A. Signals outputted by the magnetometers 242, 246 are transmitted to control circuit 250 for signal processing.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A redundant sensor system for sensing and measuring a torque associated with a shaft, the redundant sensor system comprising:

a first magnetoelastic sensor including a first magneto-elastically active region having first and second axially distinct oppositely polarized magnetically conditioned sub-regions formed by or affixed to a first section of the shaft and a first fluxgate magnetometer pair associated with the first and second sub-regions, the first sensor being configured to sense and measure a first torsional stress induced by the torque at the first section of the shaft, the first section being hollow and having a first inner diameter, wherein the first sensor is configured to output a signal indicative of the first torsional stress;

a second magnetoelastic sensor including a second magneto-elastically active region having third and fourth axially distinct oppositely polarized magnetically conditioned sub-regions formed by or affixed to a second section of the shaft a second fluxgate magnetometer pair associated with the third and fourth sub-regions, the second sensor being and configured to sense and measure a second torsional stress induced by the torque at the second section of the shaft, the second section being hollow and having second inner diameter different than the first inner diameter, wherein the second sensor is configured to output a signal indicative of second torsional stress;

a third fluxgate magnetometer pair associated the first and fourth sub-regions; and a fourth fluxgate magnetometer pair associated with the second and third sub-regions, wherein a configuration of the shaft is such that the first and second torsional stresses are different for a given non-zero torque value.

2. The redundant sensor system of claim 1, further comprising control circuitry connected in communication with the first sensor and the second sensor, wherein the control circuitry is configured to determine failure of one of the first and second sensors based on signal output of the first and second sensors.

3. The redundant sensor system of claim 2, wherein the control circuitry is configured to:

receive the signal output of the first sensor and the signal output of the second sensor; and calculate the difference in measurement value between the signal output of the first sensor and the signal output of the second sensors.

4. The redundant sensor system of claim 3, wherein the control circuitry is further configured to compare the difference in measurement value calculated to the preselected measurement value function, and to output a signal that indicates one of the first and second sensors has a failed state based on said comparison.

5. The redundant sensor system of claim 1, wherein the first section of the shaft has a different outer diameter than the second section of the shaft.

6. The redundant sensor system of claim 1, wherein an outer diameter of the first section of the shaft is equal to an outer diameter of the second section of the shaft.

7. The redundant sensor system of claim 1, wherein the first and fourth sub-regions are oppositely polarized relative to each other.

8. The redundant sensor system of claim 1, wherein the first section of the shaft has a first cross-sectional area different than a second cross-sectional area of the second section of the shaft.

9. The redundant sensor system of claim 1, wherein the magnetically conditioned sub-regions are selected from the group consisting of bands, strips, rings, and collars, the magnetically conditioned sub-regions being affixed to the shaft.

10. The redundant sensor system of claim 1, wherein the third fluxgate magnetometer is configured to output a signal indicative of a magnetic flux induced in the first and fourth sub-regions.

11. The redundant sensor system of claim 10, wherein the fourth fluxgate magnetometer is configured to output a signal indicative of a magnetic flux induced in the second and third sub-regions.

* * * * *